US009600619B2

(12) United States Patent
Chen et al.

(10) Patent No.: US 9,600,619 B2
(45) Date of Patent: *Mar. 21, 2017

(54) DISTRIBUTION OF POWER VIAS IN A MULTI-LAYER CIRCUIT BOARD

(71) Applicant: INTERNATIONAL BUSINESS MACHINES CORPORATION, Armonk, NY (US)

(72) Inventors: Zhaoqing Chen, Poughkeepsie, NY (US); Matteo Cocchini, Long Island City, NY (US); Rohan U. Mandrekar, Sunnyvale, CA (US); Tingdong Zhou, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,767

(22) Filed: Aug. 25, 2015

(65) Prior Publication Data

US 2016/0342724 A1 Nov. 24, 2016

Related U.S. Application Data

(63) Continuation of application No. 14/717,026, filed on May 20, 2015.

(51) Int. Cl.
*G06F 17/50* (2006.01)
*H05K 3/00* (2006.01)

(52) U.S. Cl.
CPC ....... *G06F 17/5072* (2013.01); *H05K 3/0005* (2013.01); *G06F 17/5077* (2013.01); *G06F 17/5081* (2013.01)

(58) Field of Classification Search
CPC ............ G06F 17/5081; G06F 17/5072; G06F 17/5077; H05K 3/0005
(Continued)

(56) References Cited

U.S. PATENT DOCUMENTS 6,581,201 B2 * 6/2003 Cano ................... G06F 17/5068
257/E23.153
6,795,957 B2 * 9/2004 Lai ....................... G06F 17/5068
716/120

(Continued)

OTHER PUBLICATIONS

List of IBM Patents or Patent Applications Treated as Related, Aug. 25, 2015, 2 pages, Appendix P.
(Continued)

*Primary Examiner* — Phallaka Kik
(74) *Attorney, Agent, or Firm* — Cantor Colburn LLP; Margaret A. McNamara

(57) ABSTRACT

One aspect is a method that includes identifying, by a power via placement tool executing on a processor of a circuit design system, a source and a sink of a voltage domain of a multi-layer circuit board based on a design file defining a layout of the multi-layer circuit board. A number of power vias to support a maximum current demand from the source to the sink is determined. Positions of a plurality of the power vias are determined at locations of the multi-layer circuit board forming paths through the power vias between the source and the sink and having a substantially equal total path length through each total path defined between the source and the sink through at least one of the power vias. The design file is modified to include the power vias at the positions.

7 Claims, 6 Drawing Sheets

(58) Field of Classification Search
USPC .............................. 716/137, 120, 127; 703/16
See application file for complete search history.

(56) References Cited

U.S. PATENT DOCUMENTS

| | | | | |
|---|---|---|---|---|
| 6,978,433 B1* | 12/2005 | Gan | .................... | G06F 17/5072 716/120 |
| 7,080,329 B1* | 7/2006 | Teig | .................... | G06F 17/5068 716/122 |
| 7,327,583 B2* | 2/2008 | Nelson | .............. | H01L 23/49827 174/255 |
| 7,382,053 B2* | 6/2008 | Takahata | ............. | H01L 23/5226 257/734 |
| 8,028,259 B2* | 9/2011 | Phan Vogel | ........ | G06F 17/5081 703/16 |
| 8,504,958 B2* | 8/2013 | Kariat | ................. | G06F 17/5036 716/110 |
| 8,510,703 B1* | 8/2013 | Wadland | ............. | G06F 17/5077 716/129 |
| 9,326,710 B1* | 5/2016 | Liu | .................... | A61B 5/14546 |
| 2003/0051218 A1* | 3/2003 | Kumagai | ............ | G06F 17/5077 257/774 |
| 2003/0229866 A1* | 12/2003 | Allen | ................. | G06F 17/5081 716/112 |
| 2004/0049750 A1* | 3/2004 | Gentry | ................ | G06F 17/5036 716/113 |
| 2005/0275497 A1* | 12/2005 | Ramadan | ................ | H01F 5/003 336/200 |
| 2006/0027919 A1* | 2/2006 | Ali | .................... | H01L 21/76816 257/734 |
| 2006/0123377 A1* | 6/2006 | Schultz | ............... | G06F 17/5036 716/112 |
| 2007/0162881 A1* | 7/2007 | Ohashi | ................ | G06F 17/5036 716/111 |
| 2010/0131907 A1* | 5/2010 | Weis | .................... | G06F 17/5068 716/110 |
| 2010/0180250 A1* | 7/2010 | Malhotra | ............ | G06F 17/5077 716/130 |
| 2012/0325530 A1* | 12/2012 | Huang | ................ | H05K 1/0265 174/257 |
| 2013/0050968 A1* | 2/2013 | Huang | ................ | H05K 1/0265 361/783 |
| 2013/0109244 A1* | 5/2013 | Chen | ..................... | H01R 12/62 439/682 |
| 2013/0109245 A1* | 5/2013 | Tseng | ................. | H01R 12/62 439/682 |
| 2013/0298101 A1* | 11/2013 | Chandra | ................. | G06F 17/50 716/136 |

OTHER PUBLICATIONS

U.S. Appl. No. 14/717,026, filed May 20, 2015, Entitled: "Distribution of Power Vias in a Multilayer Circuit Board," First Named Inventor: Zhaoqing Chen.

\* cited by examiner

700

IDENTIFY A SOURCE AND A SINK OF A VOLTAGE DOMAIN OF A MULTI-LAYER CIRCUIT BOARD BASED ON A DESIGN FILE DEFINING A LAYOUT OF THE MULTI-LAYER CIRCUIT BOARD
702

↓

DETERMINE A NUMBER OF POWER VIAS TO SUPPORT A MAXIMUM CURRENT DEMAND FROM THE SOURCE TO THE SINK
704

↓

DETERMINE POSITIONS OF THE POWER VIAS AT LOCATIONS OF THE MULTI-LAYER CIRCUIT BOARD FORMING PATHS THROUGH THE POWER VIAS BETWEEN THE SOURCE AND THE SINK AND HAVING A SUBSTANTIALLY EQUAL TOTAL PATH LENGTH THROUGH EACH TOTAL PATH DEFINED BETWEEN THE SOURCE AND THE SINK THROUGH AT LEAST ONE OF THE POWER VIAS
706

↓

MODIFY THE DESIGN FILE TO INCLUDE THE POWER VIAS AT THE POSITIONS
708

*FIG. 7*

DISTRIBUTION OF POWER VIAS IN A MULTI-LAYER CIRCUIT BOARD

DOMESTIC PRIORITY

This application is a continuation of U.S. patent application Ser. No. 14/717,026 filed May 20, 2015, the content of which is incorporated by reference herein in its entirety.

BACKGROUND

The present application relates generally to power density management in a circuit board. More specifically, the present application is directed to distribution of power vias in a multi-layer circuit board.

Printed circuit boards ("PCB") are generally fabricated from a plurality of laminated layers. Each of the layers typically includes a core fabricated from an insulating material, such as FR-4, epoxy glass, polyester or synthetic resin bonded paper, for example. Typically, a copper layer is bonded to one or both sides of the core. Circuits or "traces" are formed on the copper by applying a mask and removing unneeded copper. The individual layers are then laminated together to form the PCB.

A power distribution network for a PCB is typically designed to transfer power among different layers of the PCB. For instance, power transfer between layers can occur when a voltage regulator (i.e., a source) and the power sinks (e.g., chips or connectors) are placed on different sides of the PCB or when metal shapes are added on internal layers to attenuate high current density in certain regions, such as in proximity of voltage regulator outputs. Thick power "vias" are commonly used to transfer energy between the layers. Each of the power vias is typically expected to carry a portion of the total current transferred between layers. However, some power vias transfer much more current than others.

There is a physical limit to the current that a single via can carry before incurring in a thermal problem. In an extreme case, a via could melt, creating unwanted shorts and failures due to excess current. High current density in solid planes and dielectric in close proximity of the vias carrying more current can generate high temperatures, which is not desirable, particularly if thermally-sensitive components are in the area. Localized increases in temperature can increase metal resistivity, resulting in higher voltage drops during operation as compared to design expectations.

SUMMARY

Embodiments relate to distribution of power vias in a multi-layer circuit board. One aspect is a method that includes identifying, by a power via placement tool executing on a processor of a circuit design system, a source and a sink of a voltage domain of a multi-layer circuit board based on a design file defining a layout of the multi-layer circuit board. A number of power vias to support a maximum current demand from the source to the sink is determined. Positions of a plurality of the power vias are determined at locations of the multi-layer circuit board forming paths through the power vias between the source and the sink and having a substantially equal total path length through each total path defined between the source and the sink through at least one of the power vias. The design file is modified to include the power vias at the positions.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 7 illustrates a process of distribution of power vias in a multi-layer circuit board in accordance with an exemplary embodiment.

DETAILED DESCRIPTION

Exemplary embodiments include systems, methods and computer program products for distribution of power vias in a multi-layer circuit board. Power via placement positions are determined between a source and a sink (i.e., a current sink) of a voltage domain of a multi-layer circuit board such that a total resistance of each total path defined between the source and the sink through at least one of the power vias is substantially constant. The power vias used to bring power between layers of a circuit board may have larger diameters than signal vias used to carry signals. The larger power vias have a less substantial resistance and can result in a greater impact on creating hot spots of concentrated current. As one example, vias used for power may each have a diameter of about 20 to 40 mils, resulting in resistances of about 0.5 milliohms to 1 milliohms for a 100 mil length power via. This is comparable to a solid PCB plane resistance; thus, power via location drives total path resistance. As electrons follow the path of least resistance, the total path length between a source and a sink with a single intervening power via can be seen as the sum of the path length from the source to the power via, plus the path length across the power via, plus the path length from the power via to the sink. If the same power via length is used for all power vias between the source and sink, then the total path length is driven by the path length from the source to the power via plus the path length from the power via to the sink. With respect to the source and the sink on different layers of a multi-layer circuit board, this results in a substantially elliptical distribution of power vias, where the source and sink are foci of the elliptical distribution. If the source and sink are on the same layer of a multi-layer circuit board but separated such that another layer is needed to form a signal path between the source and sink, then the total path defined between the source and the sink is formed through at least two power vias (e.g., a first power via down from an upper layer to a lower layer and a second power via to return back to the upper layer).

Figure 1:
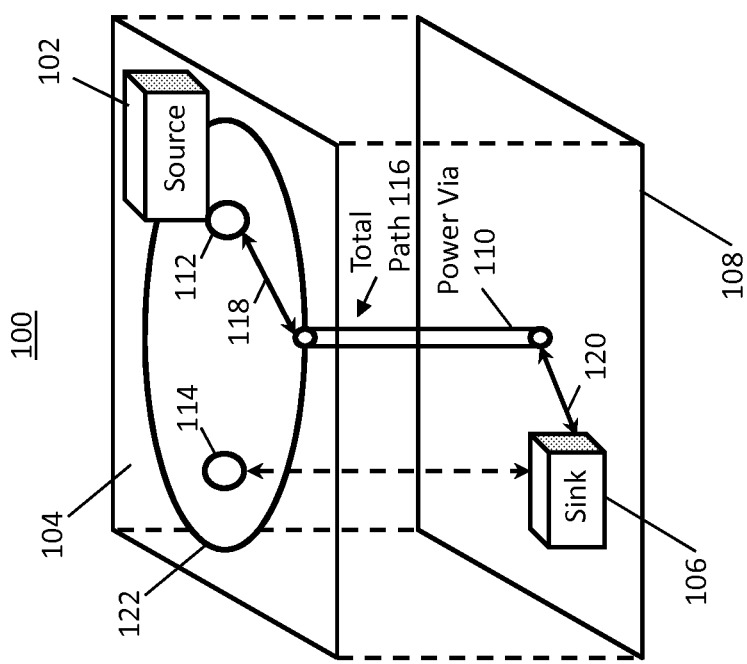
FIG. 1 is an exemplary diagram of a multi-layer circuit board manufactured according to aspects of exemplary embodiments.

Turning now to FIG. 1, a portion of a multi-layer circuit board 100 is generally shown that includes a source 102 on an upper layer 104 and a sink 106 on a lower layer 108. Note that intermediate signal routing and insulating layers (not depicted) can be included as part of the multi-layer circuit board 100 between the upper layer 104 and lower layer 108. The source 102 can be a current source for a voltage domain of the multi-layer circuit board 100, such as a voltage regulator, that supplies power to the sink 106. The sink 106 can be an integrated circuit or other electrical component that requires electrical current. To route current from the source 102 to the sink 106, a plurality of power vias 110 can be installed between the upper layer 102 and the lower layer 108, where a single power via 110 is depicted in FIG. 1. Each power via 110 carries a portion of the total current demanded by the sink 106.

A source focus 112 can be defined for the source 102 as coordinates of the source 102 with respect to the multi-layer circuit board 100. For example, there may be multiple voltage regulators operating in parallel within a voltage domain, and the source focus 112 can be defined at coordinates of a current density center of a current source of the voltage domain as a representative centralized location for determining positions of the power vias 110. Similarly, a sink focus 114 can be defined for the sink 106 as coordinates of the sink 106 with respect to the multi-layer circuit board 100. For example, there may be multiple sinks 106 operating in parallel within a voltage domain, and the sink focus 114 can be defined at coordinates of a current density center of a current sink of the voltage domain as a representative centralized location for determining positions of the power vias 110. The sink focus 114 can be projected from the lower layer 108 to the upper layer 104 for analysis purposes, as the portion of a total path 116 formed by each power via 110 can be removed from consideration where the same diameter and length are used for each power via 110. Thus, the total path 116 used to determine a total path length between the source 102 and the sink 106 through at least one power via 110 can be defined as a summation of a first path 118 between the source 102 and power via 110, and a second path 120 between power via 110 and the sink 106. With respect to each focus 112 and 114, a substantially constant path length can be achieved using an elliptical distribution 122 of the power vias 110 about the source 102 and the sink 106. This distribution is described in greater detail with respect to FIGS. 2 and 3.

Figure 2:
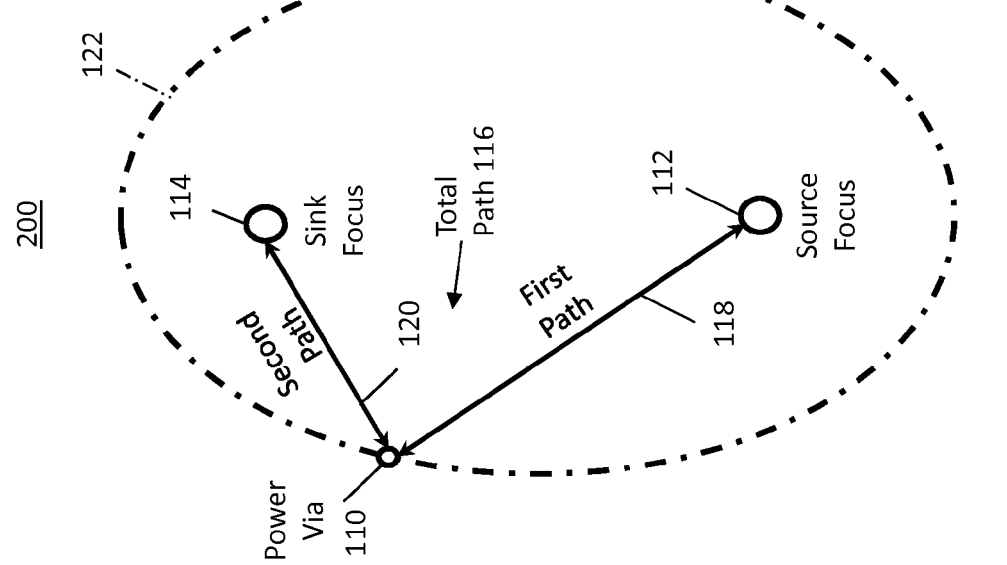
FIG. 2 depicts a path relationship between a source and sink through a power via in accordance with an embodiment.

FIG. 2 depicts a path relationship 200 between a source and sink through a power via 110 in accordance with an embodiment. To simplify the drawing, source 102 has been replaced by source focus 112, and sink 106 has been replaced by sink focus 114. A current path between the source focus 112 and sink focus 114 can be established by first path 118 through power via 110 in combination with second path 120 to form total path 116. The elliptical distribution 122 ensures that a substantially constant total path length will result with respect the source focus 112, sink focus 114, first path 118, and second path 120 regardless of where along elliptical distribution 122 that power vias 110 are placed.

Figure 3:
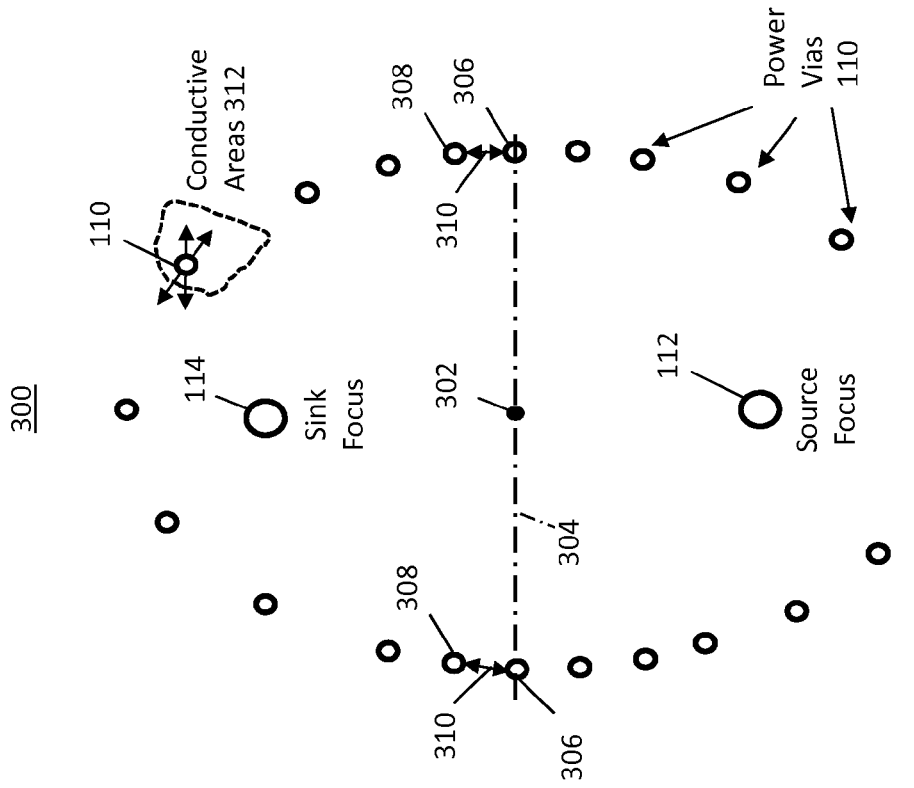
FIG. 3 illustrates placement of a plurality of power vias in a substantially elliptical pattern with respect to a source and a sink in accordance with an exemplary embodiment.

FIG. 3 illustrates placement of a plurality of power vias 110 in a substantially elliptical pattern as another example of an elliptical distribution 300 with respect to source focus 112 and sink focus 114 in accordance with an exemplary embodiment. To determine positions of the power vias 110, a midpoint 302 can be determined between the source focus 112 and sink focus 114, where a minor axis 304 of the elliptical distribution 300 is formed at the midpoint 302. To balance current distribution, power vias 110 can be placed in pairs. For example, a first pair 306 of power vias 110 can be positioned at opposite sides of an intersection between the elliptical distribution 300 and minor axis 304. A next pair 308 of the power vias 110 can be positioned offset by a minimum fixed distance 310 from the first pair 306 according to the elliptical distribution 300. Positioning of each additional pair of the power vias 110 can be repeatedly offset by the minimum fixed distance 310 from each previously placed pair of the power vias 110 according to the elliptical distribution 300. The minimum fixed distance 310 may be defined based on manufacturing constraints regarding structural stability for proximity of power vias 110 with respect to each other. Placing power vias 110 closer to the minor axis 304 reduces overlaps in resistive paths that may be observed when the power vias 110 are placed in closer proximity to the source focus 112 or the sink focus 114. Placement of the power vias 110 with respect to the elliptical distribution 300 may also be constrained by locations of conductive areas 312 with respect to the upper layer 104 and lower layer 108. For instance, a position of a power via 110 may have to shift slightly from a desired location with respect to the elliptical distribution 300 if conductive areas 312 of the upper layer 104 and lower layer 108 do not align at the desired location.

Figure 4:
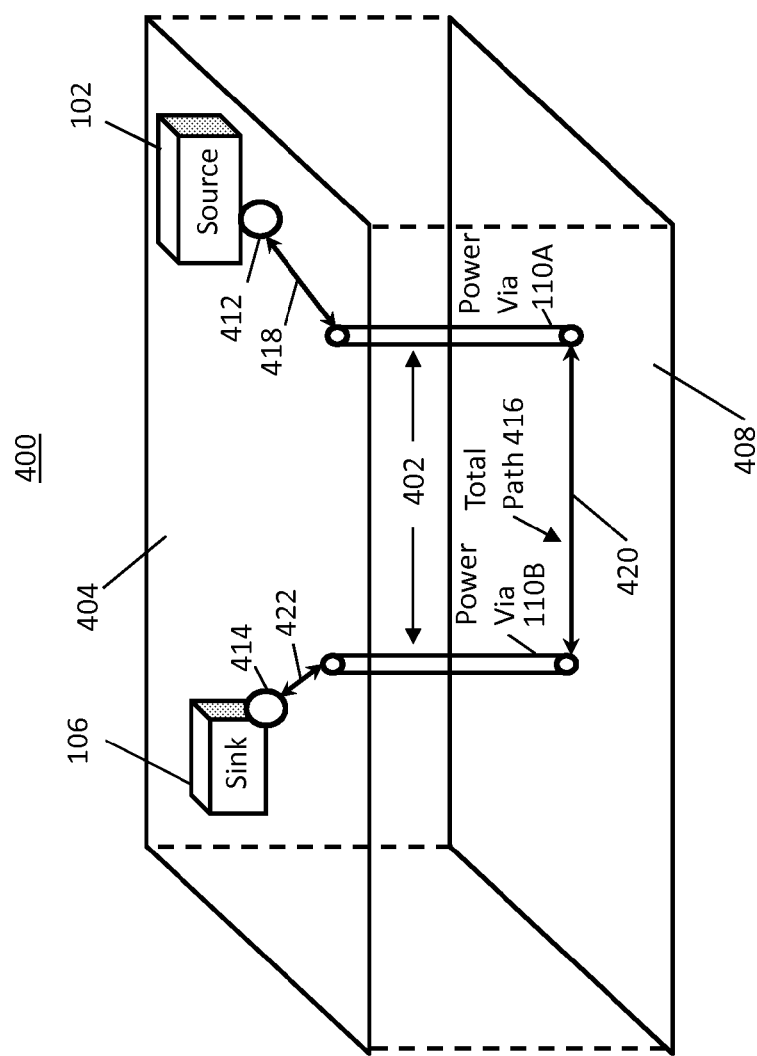
FIG. 4 is an exemplary diagram of a multi-layer circuit board with a multi-power via path between a source and sink as manufactured according to aspects of exemplary embodiments.

FIG. 4 is an exemplary diagram of a multi-layer circuit board 400 with a multi-power via path 402 between source 102 and sink 106 as manufactured according to aspects of exemplary embodiments, where both the source 102 and sink 106 are on a same layer of the multi-layer circuit board 400. In the example of FIG. 4, the source 102 and sink 106 are on upper layer 404 of the multi-layer circuit board 400, but there is not a direct conductive path between the source 102 and sink 106 on the upper layer 404, for instance, due to routing constraints. Similar to FIG. 1, a source focus 412 can be defined for the source 102 as coordinates of the source 102 with respect to the multi-layer circuit board 400, and a sink focus 414 can be defined for the sink 106 as coordinates of the sink 106 with respect to the multi-layer circuit board 400. A current path is formed between the source focus 412 and sink focus 414 by routing a path through a lower layer 408 of the multi-layer circuit board 400 and through at least two power vias 110 as a total path 416. In the example of FIG. 4, a first path 418 on the upper layer 404 is formed between the source focus 412 and a first power via 110A. A second path 420 on the lower layer 408 is formed between the first power via 110A and a second power via 110B. A third path 422 on the upper layer 404 is formed between the second power via 110B and the sink focus 414, where the first power via 110A and the second power via 110B both provide electrically conductive current paths between the upper layer 404 and the lower layer 408 as parts of the total path 416. The approach described here for same layer sink and source works only if the two power vias 110A and 110B are positioned far enough from any other power via of the same PCB power net so that the current exiting from power via 110A goes to power via 110B for the vast majority and it does not follow other paths. A good engineering assumption could be that the plane resistance between power via 110A and any other power via in the voltage domain should be less than the resistance between power via 110A and power via 110B divided by five. In this way almost all the electrons will follow the power via 100A to power via 110B path.

Figure 5:
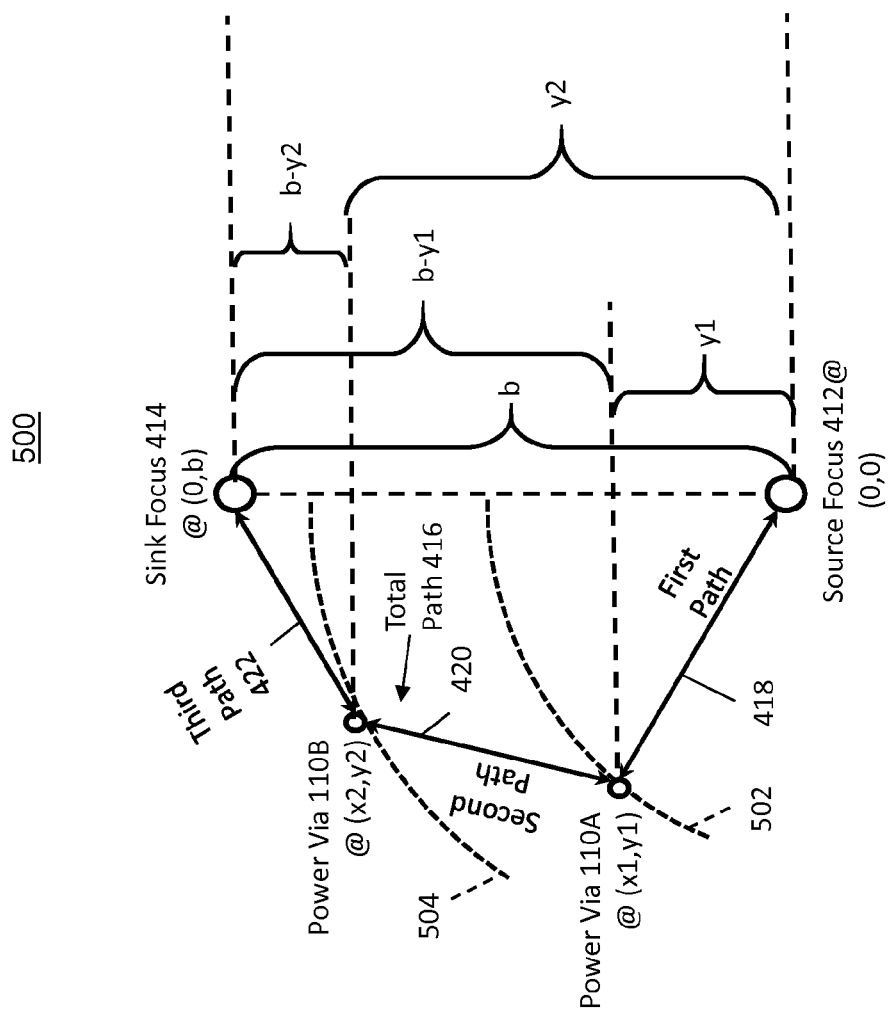
FIG. 5 depicts a path relationship between a source and sink through multiple power vias per total path in accordance with an embodiment.

FIG. 5 is a path relationship 500 between the source focus 412 and sink focus 414 through multiple power vias 110 per total path in accordance with an embodiment. As compared to the example of FIGS. 1-3, where the source 102 and the sink 106 are on the same layer of a multi-layer circuit board, the power via distribution pattern is no longer elliptical, but can be substantially optimized by making the length of total path 416 substantially constant for multiple instances of the total path 416 between the source focus 412 and the sink focus 414. A length of the total path 416 is equal to lengths of the first path 418, second path 420, and third path 422. The position of the first power via 110A has coordinates of (x1,y1), and the position of the second power via 110B has coordinates of (x2,y2) relative to source focus 412 as an origin point (0,0). In the example of FIG. 5, the sink focus 414 has coordinates of (0,b), where the source focus 412 and sink focus 414 are aligned with respect to an x-axis. The length of the first path 418 can be determined as the square root of x1 squared plus y1 squared. The length of the second path 420 can be determined as the square root of the quantity x2 minus x1 squared plus y2 minus y1 squared. The length of the third path 422 can be determined as the square root of x2 squared plus the quantity b minus y2 squared. The position of the first power via 110A can vary along a circle or arc 502 centered on source focus 412, and the position of the second power via 110B can vary along a circle or arc 504 centered on source focus 412 such that a combined total path length remains substantially constant for each set of power vias 110 placed per total path 416.

Figure 6:
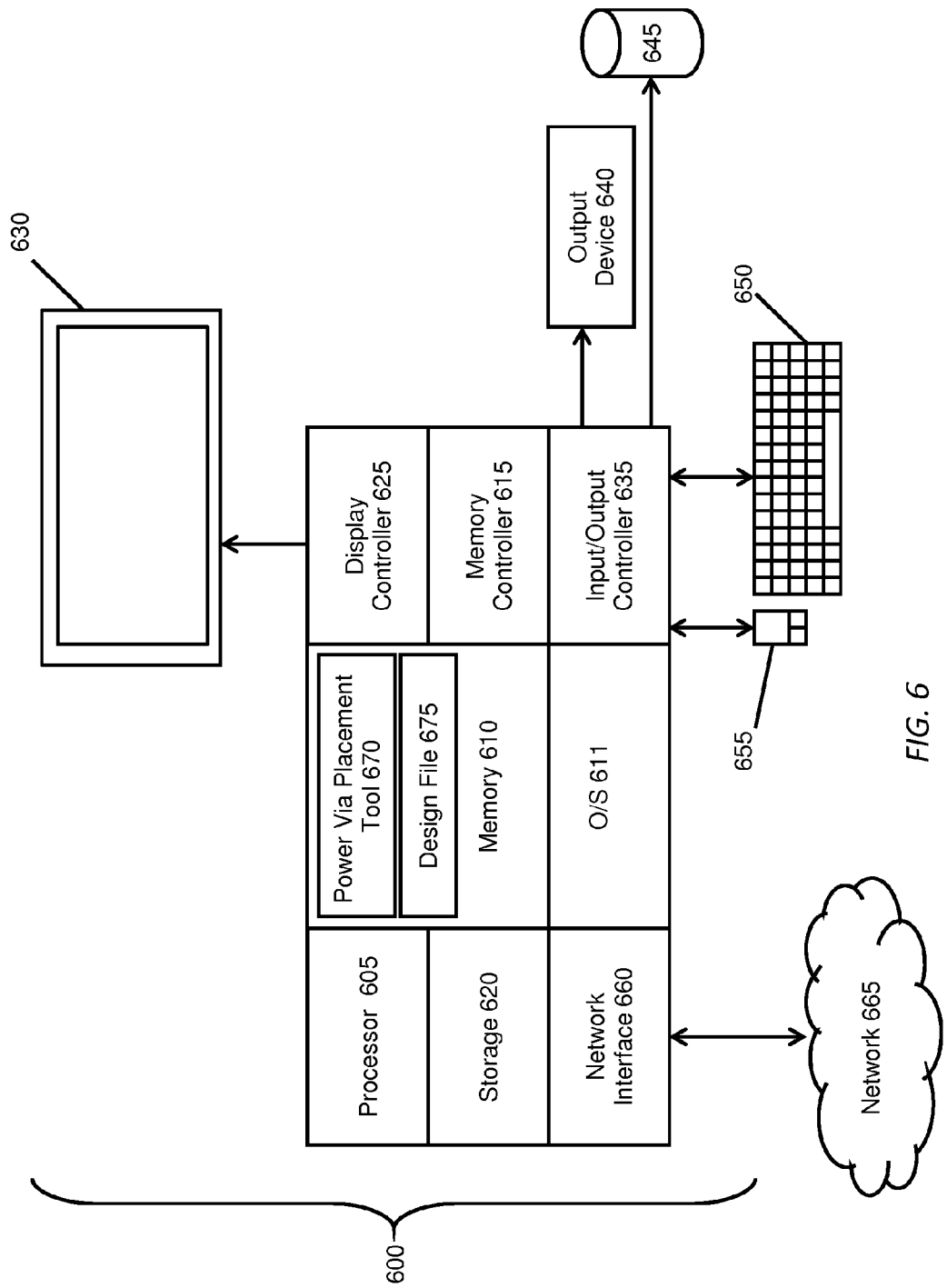
FIG. 6 illustrates a system for distribution of power vias in a multi-layer circuit board in accordance with an exemplary embodiment.

FIG. 6 illustrates a block diagram of a computer system 600 for use in implementing distribution of power vias in a multi-layer circuit board according to some embodiments. The systems and methods described herein may be implemented in hardware, software (e.g., firmware), or a combination thereof. In some embodiments, the methods described may be implemented, at least in part, in hardware and may be part of the microprocessor of a computer system 600, such as a personal computer, workstation, minicomputer, tablet computer, mobile device, or mainframe computer. The computer system 600 is also referred to as circuit design system 600 and can be equipped with additional software and hardware to support circuit design, layout, and manufacturing of a multi-layer printed circuit board.

In some embodiments, as shown in FIG. 6, the computer system 600 includes a processor 605, physical memory 610 coupled to a memory controller 615, and one or more input devices 645 and/or output devices 640, such as peripherals, that are communicatively coupled power via a local I/O controller 635. These devices 640 and 645 may include, for example, a printer, a scanner, a microphone, and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in the physical memory 610. The processor 605 may be a custom made or commercially available processor, a central processing unit (CPU), an auxiliary processor among several processors associated with the computer system 600, a semiconductor based microprocessor (in the form of a microchip or chip set), a macroprocessor, or other device for executing instructions.

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid state drive.

The computer system 600 may further include a display controller 625 coupled to a display 630. In some embodiments, the computer system 600 may further include a network interface 660 for coupling to a network 665.

Systems and methods according to this disclosure may be embodied, in whole or in part, in computer program products or in computer systems 600, such as that illustrated in FIG. 6. For example, a power via placement tool 670 can access a design file 675 to determine a layout definition of a multi-layer circuit board and transform the layout definition of the multi-layer circuit board according to the methods described herein for distribution of power vias. The power via placement tool 670 may be comprised of program instructions executable by the processor 605. The power via placement tool 670 can be stored in a computer readable storage medium such as the memory 610 and/or storage 620. Similarly, the design file 675 can be stored in a computer readable storage medium such as the memory 610 and/or storage 620. The power via placement tool 670 and/or design file 675 may be received over the network 665, and updates to the design file 675 can be transmitted over the network 665 to support other circuit board manufacturing operations. Although only a single power via placement tool 670 and design file 675 are depicted in FIG. 6, it will be understood that the power via placement tool 670 and/or design file 675 can be further subdivided, distributed, or incorporated as part of another application, file system, or data structure.

FIG. 7 illustrates a flow diagram of a method 700 for distribution of power vias in a multi-layer circuit board in accordance with an exemplary embodiment. The method 700 can be performed by the power via placement tool 670 executing on the processor 605 of a circuit design system 600 of FIG. 6 and is further described in reference to FIGS. 1-6 for purposes of explanation. However, the method 700 of FIG. 7 can be implemented on systems with alternate configurations and elements beyond those depicted in the examples of FIGS. 1-6.

At block 702, a source and a sink of a voltage domain of a multi-layer circuit board are identified based on a design file defining a layout of the multi-layer circuit board. Coordinates of a current density center of a current source of the voltage domain can be determined as coordinates of the source with respect to the multi-layer circuit board. Coordinates of a current density center of a current sink of the voltage domain can be determined as coordinates of the sink with respect to the multi-layer circuit board.

At block 704, a number of power vias to support a maximum current demand from the source to the sink is determined. The number of power vias can be determined by dividing the maximum current demand by a maximum current capacity per power via and rounding up to a next even number. For example, if there is a maximum current demand of about 50 amps, and the maximum current capacity per power via is about 0.56 amps, then the total number of power vias to distribute may be determined as a value of 90. Additional margin can be included in the computation to further reduce the risk of overloading any power vias.

At block 706, positions of a plurality of the power vias are determined at locations of the multi-layer circuit board forming paths through the power vias between the source and the sink and having a substantially equal total path length through each total path defined between the source and the sink through at least one of the power vias. Based on determining that the source and the sink are on different layers of the multi-layer circuit board, an elliptical distribution of the power vias can be computed about the source and the sink, where the source and the sink are each a focus of the elliptical distribution. A first pair of the power vias can be positioned at opposite sides of an intersection between the elliptical distribution and a minor axis formed at a midpoint between the source and the sink. A next pair of the power vias can be positioned offset by a minimum fixed distance from the first pair according to the elliptical distribution. Positioning of each additional pair of the power vias can be repeatedly offset by the minimum fixed distance from each previously placed pair of the power vias according to the elliptical distribution. Based on determining that the source and the sink are on a same layer of the multi-layer circuit board, each total path defined between the source and the sink can be computed through at least two of the power vias.

At block 708, the design file is modified to include the power vias at the positions. The modified and transformed design file can be used for further processing to manufacture a multi-layer circuit board according to the layout defined in the design file.

Technical effects and benefits include modifying a design layout of a multi-layer circuit board such that multiple parallel current paths formed between a source and a sink have substantially similar total path lengths. Establishing substantially similar total path lengths keeps the resistance of each parallel path substantially constant to avoid excessive current channeling through a subset of power vias and reduces the formation of thermal hot spots due to uneven current distribution. An electron has the same probability to follow one of the paths when the path resistance is comparable; the same probability could be extended to a larger number of electrons like in PCB current flow.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   identifying, by a power via placement tool executing on a processor of a circuit design system, a source and a sink of a voltage domain of a multi-layer circuit board based on a design file defining a layout of the multi-layer circuit board;
   determining a number of power vias to support a maximum current demand from the source to the sink;
   determining positions of the determined number of the power vias at locations of the multi-layer circuit board forming paths through the power vias between the source and the sink and having a substantially equal total path length through each total path defined between the source and the sink through at least one of the power vias;
   modifying the design file to include the power vias at the positions; and
   fabricating or having fabricated the multi-layer circuit board based on the modified design file.

2. The method of claim 1, further comprising:
   determining coordinates of a current density center of a current source of the voltage domain as coordinates of the source with respect to the multi-layer circuit board; and
   determining coordinates of a current density center of a current sink of the voltage domain as coordinates of the sink with respect to the multi-layer circuit board.

3. The method of claim 1, wherein the number of power vias is determined by dividing the maximum current demand by a maximum current capacity per power via and rounding up to a next even number.

4. The method of claim 1, further comprising:
   based on determining that the source and the sink are on different layers of the multi-layer circuit board, computing an elliptical distribution of the power vias about the source and the sink, wherein the source and the sink are each a focus of the elliptical distribution.

5. The method of claim 4, further comprising:
positioning a first pair of the power vias at opposite sides of an intersection between the elliptical distribution and a minor axis formed at a midpoint between the source and the sink.

6. The method of claim 5, further comprising:
positioning a next pair of the power vias offset by a minimum fixed distance from the first pair according to the elliptical distribution; and
repeating positioning of each additional pair of the power vias offset by the minimum fixed distance from each previously placed pair of the power vias according to the elliptical distribution.

7. The method of claim 1, further comprising:
based on determining that the source and the sink are on a same layer of the multi-layer circuit board, computing each total path defined between the source and the sink through at least two of the power vias.

* * * * *